United States Patent
Tardelli et al.

(10) Patent No.: US 9,135,410 B2
(45) Date of Patent: Sep. 15, 2015

(54) DIGITAL RIGHTS MANAGEMENT USING A DIGITAL AGENT

(75) Inventors: Dana Tardelli, Atlanta, GA (US);
 Ginger Chien, Bellevue, WA (US);
 Adrianne Binh Luu, Roswell, GA (US);
 Leonid Razoumov, Riverdale, NY (US);
 Nemmara K. Shankaranarayanan,
 Bridgewater, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/333,132

(22) Filed: Dec. 21, 2011

(65) Prior Publication Data
 US 2013/0166492 A1     Jun. 27, 2013

(51) Int. Cl.
 *G06K 9/00*     (2006.01)
 *G06F 21/10*   (2013.01)
 *G06N 99/00*   (2010.01)

(52) U.S. Cl.
 CPC ............... *G06F 21/10* (2013.01); *G06N 99/00* (2013.01)

(58) Field of Classification Search
 CPC .................................................. G06K 9/00221
 USPC ........................................................ 706/62
 See application file for complete search history.

(56) References Cited

U.S. PATENT DOCUMENTS

| | | | |
|---|---|---|---|
| 7,277,891 B2 * | 10/2007 | Howard et al. | ............... 707/707 |
| 7,568,234 B2 | 7/2009 | Naslund et al. | |
| 7,885,871 B2 | 2/2011 | Lee et al. | |
| 2007/0061886 A1 | 3/2007 | Le | |
| 2008/0046758 A1 | 2/2008 | Cha et al. | |
| 2009/0252383 A1 * | 10/2009 | Adam et al. | ................... 382/118 |
| 2009/0328230 A1 | 12/2009 | Byun et al. | |
| 2012/0087552 A1 * | 4/2012 | Lee | ................................ 382/118 |
| 2012/0090034 A1 * | 4/2012 | Kang et al. | ........................ 726/26 |

OTHER PUBLICATIONS

H.R. Gordon, "Right of Property in Name, Likeness, Personalty and History", 55 Nw. Univ. L. Rev. 553-612, 1960.*
P. Langley, "Elements of Machine Learning", Morgan Kaufmann Publishers, Inc., San Francisco, CA, 1996, pp. 104-107.*
R. Merges, P. Menell, and M. Lemley, "Intellectual Property in the New Technological Age", Fourth Edition, p. 576, 2006.*
D. Lichtman and W. Landes, "Indirect Liability for Copyright Infringement: An Economic Perspective", 16 Harv. J.L. & Tech. 395-410 (Spring 2003).*

* cited by examiner

*Primary Examiner* — Kakali Chaki
*Assistant Examiner* — Vincent Gonzales
(74) *Attorney, Agent, or Firm* — Chiesa Shahinian & Giantomasi PC

(57) ABSTRACT

A method for digital rights management includes a digital agent for contacting a media host. Media content is compared to a user profile and an identification confidence level is assigned to the media based on the comparison. A digital agent contacts a host of the media based on the identification confidence level, the type of media, and the context of the media. The digital agent requests one or more actions of a media host based on user designations concerning information related to the media. The identification confidence level is generated based on a plurality of user characteristic confidence levels which are generated based on media being analyzed.

20 Claims, 7 Drawing Sheets

| 408 | 410 | 412 | 414 | 416 | 418 | 420 | 422 | 424 |
|---|---|---|---|---|---|---|---|---|
| PROFILE ID | NAME | DATE OF BIRTH | HEIGHT | WEIGHT | LINGUISTICS | SCHEDULE | LOCATION | AUTHORSHIP |
| 1 | JOHN SMITH | 11/07/58 | 5'8" | 150LBS | JS11071958.lpm | JS11071958.sch | JS11071958.loc | "MULTI-TRACK RECORDING AND MIXING" |
| 2 | TONY AFRES | 5/18/84 | 6'1" | TA5181-984.wgt | UNKNOWN | UNKNOWN | Albuqerque, NM | NONE |
| .... | .... | .... | .... | .... | .... | .... | .... | .... |
| 1001 | FREDERICK FINEMAN | 10/13/42 | 5'6" | 145 | UNKNOWN | RF101342.sch | 41:55:39N, 74:25:40W | "ANCIENT GREECE" |

| 608 | 610 | 612 | 614 | 616 | 618 | 620 | 622 | 624 |
|---|---|---|---|---|---|---|---|---|
| MEDIA ID | MEDIA TYPE | DATE CREATED | OWNERSHIP | CONTENT | RELATED MEDIA | PERSON DEPICTED | IDENTIFICATION CONFIDENCE LEVEL | FILE LOCATION |
| 1 | DIGITAL IMAGE | 12/13/05 | JOHN DOE | PORTRAIT | GRAND CANYON PICS 12/1/97 | JANE DOE | 87 | C:/PICTURES/GCP 12/1/97 |
| 2 | DIGITAL VIDEO | 1/8/11 | EMILY TARG | DESERT | UNKNOWN | JOHN TARG | 92 | G:/VIDEO |
| .... | .... | .... | .... | .... | .... | .... | .... | .... |
| 1001 | WORD PROCESSING DOCUMENT | 5/8/07 | FRED BILLUS | ARTICLE | UNKNOWN | N/A | 99 | H:Docs/Articles/ Popular_Computing |

*FIG. 6*

| 708 | 710 | 712 | 714 | 716 | 718 | 720 | 722 |
|---|---|---|---|---|---|---|---|
| MEDIA ID | MEDIA TYPE | DATE CREATED | OWNERSHIP | LICENSED TO | DATE LICENSED | LICENSE TERM | AGREEMENT STORAGE LOCATION |
| 1 | DIGITAL IMAGE | 12/13/05 | JOHN SMITH | INFINIEN | 12/15/05 | 12 MONTHS | C:/Licenses/ JSmith/Images |
| 2 | DIGITAL VIDEO | 1/8/11 | EMILY TARG | TOM MOORE | 5/25/11 | UNLIMITED | G:/Licenses/ ETarg/Video |
| .... | .... | .... | .... | .... | .... | .... | .... |
| 1001 | WORD PROCESSING DOCUMENT | 5/8/07 | FRED BILLUS | NONE | N/A | N/A | N/A |

FIG. 7

DIGITAL RIGHTS MANAGEMENT USING A DIGITAL AGENT

FIELD OF THE DISCLOSURE

The present disclosure relates generally to image analysis, person recognition, and ownership identification, and more particularly to digital rights management using a digital agent.

BACKGROUND

The Internet allows anyone to publish media such as images and documents soon after generation or creation. Media such as images may be posted without identification of the people depicted in the images. In addition, media posted online may be copied by others and used without attributing the media to the author of the media. Further, media depicting a particular person may be posted by another in a malicious manner. Media may also be plagiarized or altered. Users who want to make sure that any images depicting them are used in a non-malicious manner or properly identify the user must spend a significant amount of time searching networks (such as the internet) to find these images. Similarly, a user who wants to determine if their work has been plagiarized must spend a significant amount of time searching networks. After an image is found or plagiarism of a user's work has been determined, the user must contact the host of the media in order to request certain corrective actions be taken. This combination of searching and requesting correction adds to an even greater amount of time required by a user.

SUMMARY

The present disclosure provides a method and apparatus for digital rights management using a digital agent.

In one embodiment, a method for digital rights management includes comparing media content to a user profile. An identification confidence level is assigned to the media based on the comparing. A host of the media is contacted based on the identification confidence level. The comparing media content to a user profile, in one embodiment, comprises comparing the media content to a plurality of user characteristics, determining a characteristic confidence level for each of the plurality of characteristics, and assigning an identification confidence level based on the characteristic confidence levels. A user profile is generated based on received seed media describing a user wherein a plurality of user characteristics are generated based on the seed media. A host providing media may be contacted based on media type and/or media content. A host can be contacted via email which can contain one of a request to license the media, a request to identify a user depicted in the media, and a request to remove the media from display.

These and other advantages of the inventive concept will be apparent to those of ordinary skill in the art by reference to the following detailed description and the accompanying drawings.

BRIEF DESCRIPTION OF THE DRAWINGS

FIG. 4 depicts a table storing user profiles;

FIG. 6 depicts a table storing media and related information;

FIG. 7 depicts a table storing licensing information related to media; and

DETAILED DESCRIPTION

Figure 1:
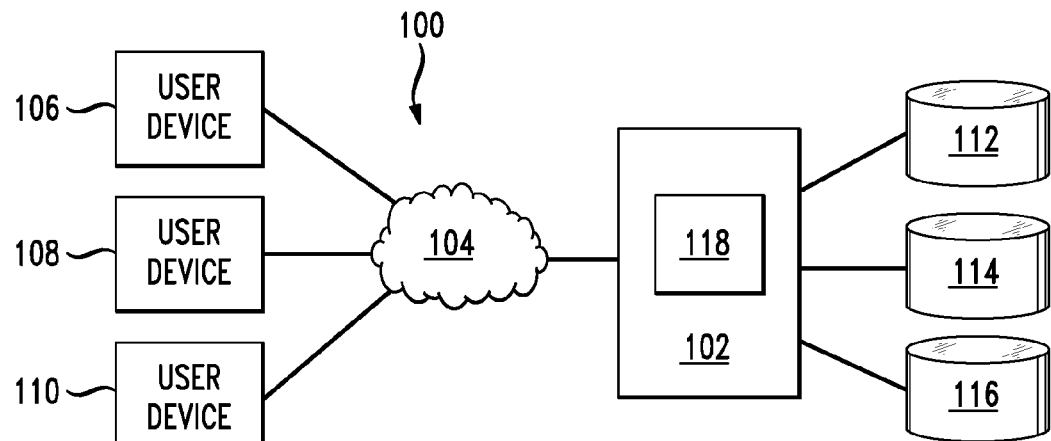
FIG. 1 depicts a system for managing digital rights using a digital agent.

FIG. 1 depicts a system for personal digital rights management using a digital agent. Media server 102 is a computing device for receiving, analyzing, identifying, categorizing, and transmitting media. Media server 102, in one embodiment, is a computer. Media server 102 is connected to network 104 which can be a wireline or wireless network, local area network or wide area network (e.g., the internet) or combination of such networks. User device 106 is in communication with media server 102 via network 104. User device 106 is, in one embodiment, a handheld computing device such as a smart phone. In other embodiments, user device 106 can be other computing devices such as a desktop computer, laptop computer, cell phone, personal digital assistant, etc. Additional user devices 108, 110 are also in communication with media server 102 as well as with each other and user device 106 via network 104.

Media server 102 is in communication with media database 112 which stores various media such as images, videos, documents, audio, web/digital contents (e.g., RSS feeds, blogs, emails), etc.

Media server 102 is also in communication with user profile database 114 which stores information related to a user's profile which is derived as described below. Media server 102 is also in communication with license database 116 which stores information related to licensing and related agreements pertaining to a user's media.

The system of FIG. 1 operates to aid a user in digital rights management using a digital agent. Before the digital agent searches for media on a network, a user profile is generated. The user profile stores user characteristics such as facial dimensions for use with facial recognition, body dimensions, a voice profile for use with voice recognition, the user's location at different times, etc. The user characteristics are used to identify the user depicted in media found while searching a network. Seed media is used to initialize the user profile. Seed media is media provided by a user that is known to describe the user. For example, seed media provided by a user can include one or more images or videos of the user. After the user profile is generated, the digital agent scours networks to find media which depicts the user by comparing characteristics of media found on the networks to characteristics stored in the user profile.

Since exact identification of a user in media, such as an image, is not always possible, an identification confidence level is assigned to media determined to possibly depict the user. This identification confidence level is based on one or more characteristic confidence levels each of which indicate how closely user characteristics depicted in media found on a network match user characteristics stored in the user profile. For example, a user's face depicted in an image may be identified as a match with a certain characteristic confidence level. A user's location depicted in an image may be identified as a match with another characteristic confidence level. The two characteristic confidence levels are used to determine the identification confidence level. The digital agent may contact a host providing media related to a particular user based on user defined criteria such as the type of media provided by the host and the identification confidence level associated with the media. For example, the digital agent may email the host and request that the host accept the terms of a licensing agreement in order to continue providing the media. It should be noted that although media is described above as including images and video, media can also include audio, text, digital renderings, etc. In general, any type of media that a user wants to protect or enforce their rights over can be analyzed. Further, it should be noted that although a user profile is initially generated using seed media, media subsequently analyzed can be used to update and/or modify a user profile.

Media server 102 is configured to operate digital agent 118. Digital agent 118 scans network 104 for media and determines media that may be related to a particular user. Digital agent 118 is an emissary of a user and acts on the user's behalf, in this example, managing the digital security and rights of the user. Media server 102, in one embodiment, is configured to contact entities hosting media that is related to a particular user.

Figure 2:
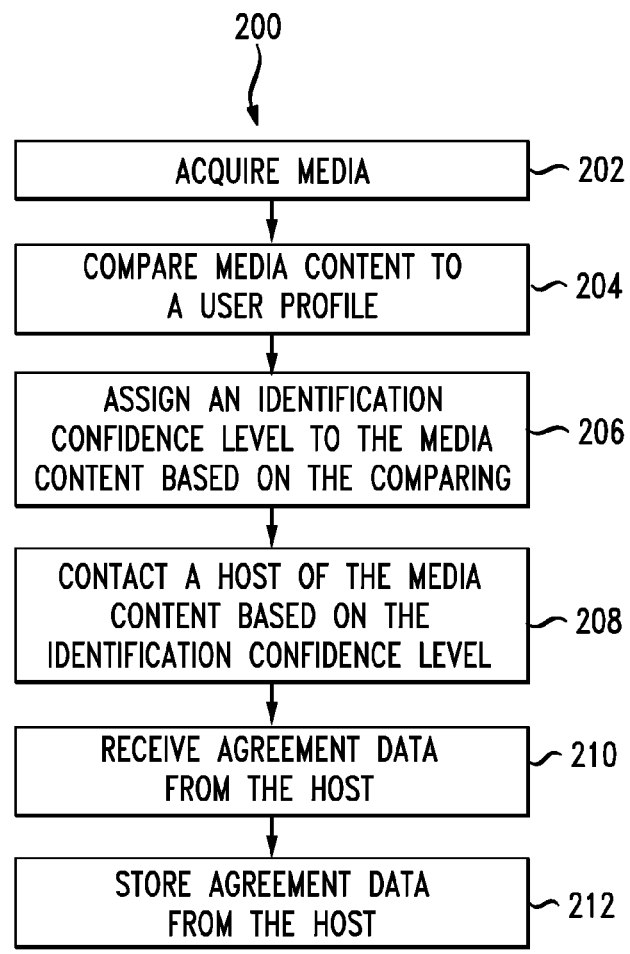
FIG. 2 depicts a flow chart for identifying media related to a user and contacting a host providing the media.

FIG. 2 depicts method 200 for managing digital rights using a digital agent. At step 202 media is acquired for analysis. In one embodiment, media server 102 acquires media from network 104. The acquired media can be any type of media such as an image, video, document, etc. At step 204 the content of the acquired media is compared to a user profile. For example, an image acquired from network 104 can be compared to a user profile stored in user profile database 114 which includes data pertaining to identification of a user, such as data required to perform facial recognition of a user. An identification confidence level is assigned to the acquired media, in one embodiment, based on the comparison of the content of the acquired media to the user profile. The confidence level indicates the level of accuracy of the identification and, in one embodiment, can be a value from 0 to 100 with a higher value indicating a higher level of confidence. For example, if the acquired media is an image, a user may be identified in the image with a certain level of confidence depending on facial recognition and other factors (discussed in detail below).

At step 208, a host of the acquired media is contacted based on the identification confidence level. For example, a user may configure digital agent 118 to contact hosts providing media if the media is determined to depict a user with an identification confidence level of a specific value or greater (e.g., if identification confidence level is 85 or greater, then host is contacted.) The substance of the contact with the host depends on user defined factors such as the identification of media related to the user, the type of media, the identification confidence level, and the context of the media. For example, an image of a user assigned an identification confidence level of 85 and depicts the user at a charity event but the user's name is not indicated. Based on these factors, digital agent 118 can automatically contact the entity hosting the image and request that the user's name be indicated with the image. Digital agent 118 can contact the entity hosting the image via any form of communication available to reach the hosting entity (e.g., via email, voice, voicemail, instant messaging, etc.). In one embodiment, an intermediating agent (e.g., a request broker) can translate and reformat requests to be sent to a host as needed. In addition, the intermediating agent can perform other functions such as locating the ultimate responsible hosting or transmitting party when offending media is initially found on a non-responsible site such as a public bulletin board or leveraging a standing relationship with a host that allows for faster resolution than through a direct owner request.

At step 210, agreement data is received from the host. For example, the host may indicate that a web page may be altered to display the user's name in a caption of the image depicting the user. At step 212, the agreement data from the host is stored, for example, in a database such as license database 116.

Before searching for media related to a particular user is performed, a user's profile is determined. A user's profile is determined using media which is known to describe the user and/or the user's work (referred to as seed media). For example, a particular user can provide one or more images and videos which depict the user (i.e., seed media). The seed media provided can be analyzed to determine characteristics which identify the user and media associated with the user (e.g., documents written by the user, etc.)

Figure 3:
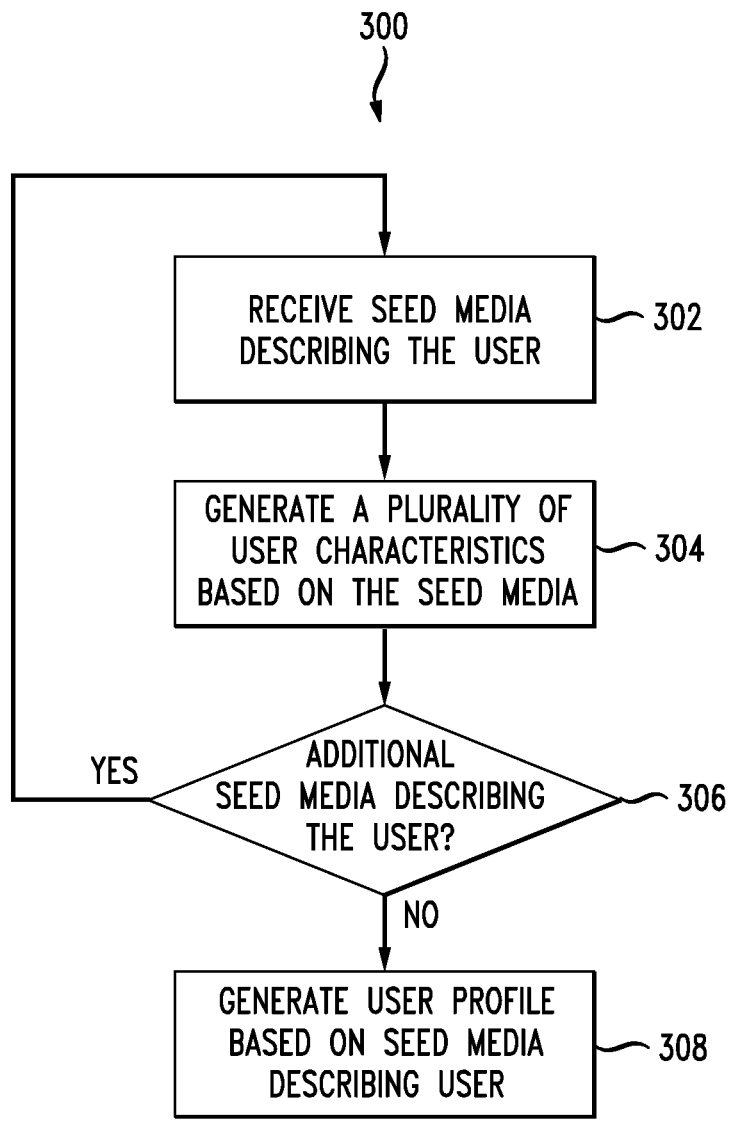
FIG. 3 depicts a flow chart for generating a user profile based on seed media.

FIG. 3 depicts method 300 for generating a user profile based on seed media. At step 302, seed media describing a user is received. Seed media, in one embodiment, is media which depicts a particular user. For example, media such as images and videos which depict the user can be used as seed media. Generally, seed media unambiguously depicts a user so that an accurate user profile can be generated. For example, images used as seed media should provide clear depictions of a user from multiple perspectives. Videos used as seed media should provide various examples of a user's gait, gestures, etc. Audio used as seed media should provide various user voice samples sufficient to generate a reliable voice profile of a user. In one embodiment, a user supplies the seed media to generate a user profile for the user, however, a person other than the user may provide the seed media as well to generate a user profile as well.

At step 304, a plurality of user characteristics are generated based on the seed media. User characteristics, in one embodiment, are elements which can be used to identify a user. For example, a voice profile for a user can be generated based on audio seed media. Data for use with facial recognition can be generated based on image seed media. Patterns concerning a user's gait, gestures, and body shape can be generated for use in detecting user characteristics.

At step 306, a determination is made as to whether there is additional seed media describing a user. If there is additional media, the method repeats steps 302 and 304 for the additional media. If there is no additional media, a user profile is generated based on the media describing the user. The user profile comprises the plurality of user characteristics generated based on seed media in step 304.

Depending on the type of seed media, various additional user characteristics can be identified. For example, both image and video media can be used to generate additional user characteristics such as user location at specific dates and times, clothing owned or worn by a user, body movements particular to the specific user, facial ticks, people/places users have been associated with, etc. Seed media can include a user's first-order characteristics (i.e., a user's immediate characteristics such as physical dimensions of the user's face and body) as well as secondary attributes such as a user's relationships with others. The secondary attributes can help identify a primary subject. For example, it is known that a user and a particular person are generally in one another's presence. If an image shows a front view of the particular person and the backside of an unidentified person, the unidentified person may be identified as the user based on the knowledge that the user and the particular person are generally in one another's presence.

Seed media can also comprise other media such as documents (e.g., documents authored or contributed to by user), calendar entries (as well as general future plans), location information, lifestyle data (e.g., purchases, interests, likes/dislikes), habits, personal preferences, correspondence and communications (including text, voice, video, etc.), pre-defined events and actions, quirks, values/morals, occupation, employers, etc.

The user profile generated in step 308 can be stored in a database, such as user profile database 114. FIG. 4 depicts user profile table 400 comprising multiple records 402, 404, 406, wherein each record stores user profile data pertaining to a particular user. Profile ID 408 uniquely identifies each user profile. Additional columns store user information such as name 410, date of birth 412, height 414, and weight 416. Linguistics 418 stores data pertaining to a user's voice for use in voice recognition. Schedule 420 stores information pertaining to a user's schedule which can be used to aid in the identification of a user in media. Similarly, location 422 stores information pertaining to a user's location. Authorship 424 identifies documents authored by a user either solely or in conjunction with additional authors. It should be noted that in one embodiment entries (also referred to as cells) contain data representing a single value. For example, cells in location 422 column may contain a single location, such as Albuquerque, N. Mex. in record 404. In other embodiments, cells may contain files or links to files containing multiple values over time. For example, location 422 cell of record 402 states "JS11071958.loc" which identifies a file containing multiple user locations at various times. By using a file, the location of a particular user at specific times can be determined which can aid in identification of a user in media. For example, if an image depicts a user at a specific location at a specific time, a file stored in location 422 can be used to confirm that the user was indeed located at the specific location at a specific time as determined by the image and associated data (e.g., an EXIF file associated with the image).

Figure 5:
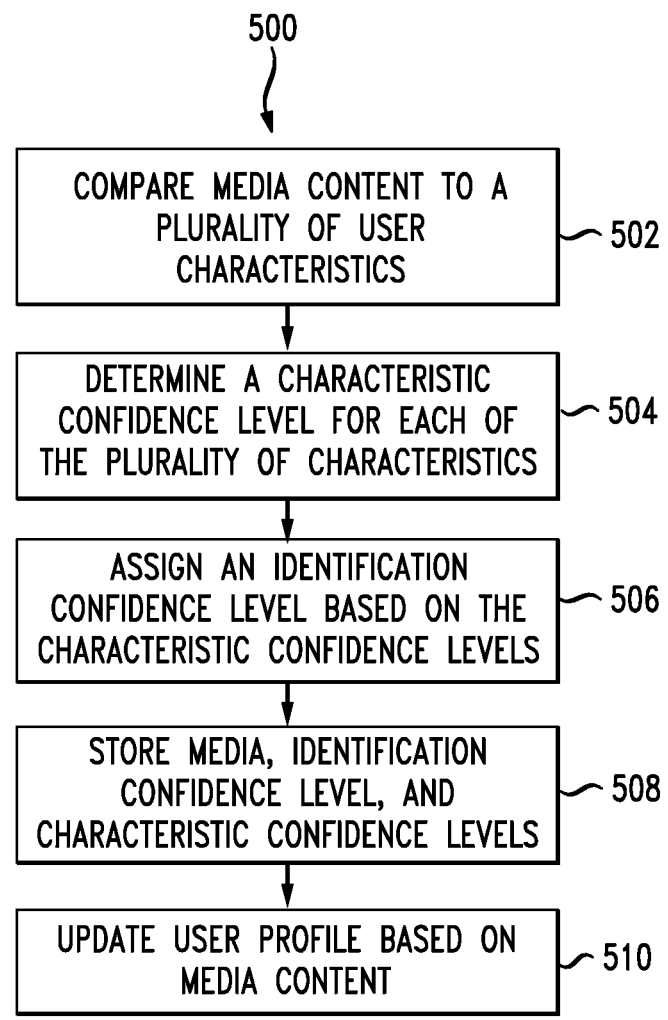
FIG. 5 depicts a flow chart for determining an identification confidence level based on a plurality of characteristics.

As previously described in conjunction with FIG. 2, media content is compared to a user profile (step 204) and an identification confidence level is assigned to the media (step 206). FIG. 5 depicts a flow chart further defining steps 204 and 206 of FIG. 2. At step 502, media content is compared to a plurality of user characteristics. For example, a video depicting a person can be analyzed using voice recognition to identify the person in the image. The data for use in identifying the person, in this case, would be linguistics characteristics such as the data stored in or identified by linguistics 418 column of FIG. 4. Additional characteristics such as height 414, weight 416, and schedule 420 can be compared to the media as well.

At step 504, a characteristic confidence level for each of a plurality of characteristics is determined. For example, media content compared with user characteristics may not result in a perfect match. Depending on the content of the media, such as the length of a voice sample, a characteristic confidence level may be less than 100 (i.e., a perfect match). In these situations, a characteristic confidence level of less than 100 may be determined based on how well the media content matches a corresponding characteristic. A characteristic confidence level is determined for each characteristic compared to media content.

At step 506, an identification confidence level is assigned to the media based on the characteristic confidence levels. In one embodiment, the identification confidence level is an average of the all the characteristic confidence levels related to the media being analyzed. In other embodiments, other methods of generating an identification confidence level may be used.

At step 508, the media, identification confidence level and characteristic confidence levels are stored, for example, in a database such as media database 112 shown in FIG. 1. At step 510, one or more user profiles (e.g., user profile records 402, 404, 406 of table 400 shown in FIG. 4) are updated based on the media content. Thus, although a user profile is initially generated using seed media, media that is subsequently analyzed may be used to update and/or modify the user profile.

FIG. 6 depicts media table 600 storing data related to media, such as seed media (described in conjunction with FIG. 3) or media analyzed as depicted in FIG. 2. Media and related information are stored in records 602, 604, and 606. Each piece of media has a unique identification number stored in media ID 608. Information related to media is stored in additional columns including media type 610, date created 612, ownership 614, content 616, and related media 618, and file location 624 which indicates where the media is stored. Information concerning the content of the media is stored in additional columns such as person depicted 620. It should be noted that table 600 is exemplary and media tables may include additional columns for storing additional information such as location depicted, objects depicted, etc. Identification confidence level 622 stores a value of 1-100 which indicates the probability that an identification, such as the identification of a person, is correct. A confidence level of 100 indicates that the identification is absolutely correct. Values less than 100 indicate the probability that the identification is correct. Although not shown in table 600, additional columns for other characteristics and characteristic confidence levels may be listed as well.

Returning to FIG. 2, steps 208-212 pertain to digital agent 118 contacting a host of media regarding the use of media identified as owned by a particular user. For example, a particular user may designate that any image of the user found that is being provided by a host should indicate the user's name when the image is displayed. The user may further designate that actions should be taken for images having an identification confidence level of greater than a threshold level (e.g., 85) that are displayed without indicating the user's name. The host providing the image of the user may be contacted to indicate the user's desire to have the user's name displayed with the image. Contact with the host may be made via email, telephone, or other type of correspondence. Communications from the host concerning an agreement are stored, for example, in a database such as licensing database 116 shown in FIG. 1. In one embodiment, a workflow system automatically manages owner-host communications. Automated actions and closure of open requests, in one embodiment, are enhanced by establishing deterministic end-to-end automation and uniform data protocols. For example, an owner request can be in a specific format which elicits a response from a host in a specific format wherein the format is known and used by both parties.

In one embodiment, a default action is taken based on how the media provided by a host can be used or shared and whether the media is determined to have a confidence level of greater than a threshold value. For example, if the confidence level is at 85% or more for the media and the host is sharing the media in a way that only allows others (those besides the host) to access (e.g., view or listen) then the digital agent would automatically grant permission to the host to share in this case—assuming the image is displayed with the user name or other agreed upon information (e.g., age, height, weight, etc.). If the digital agent determines that the host allows others to do more than access (e.g., view or listen) the media (e.g., download and/or modify) then the digital agent can be configured to contact the user to receive additional details concerning how to proceed. In one embodiment, the digital agent can send a host additional documents or messages informing the host of potential action that may be taken by an owner of the media provided by the host.

FIG. 7 depicts licensing table 700 which contains licensing records 702, 704, and 706 which each store licensing information pertaining to media. Each piece of media is identified by media ID 708 which, in one embodiment, is the same value used in media ID 608 of FIG. 6. Information concerning the media is contained in media type 710 and date created 712. Ownership 714 identifies the owner(s) of the related media. Information concerning licensing are stored in licensed to 716, date licensed 718, and license term 720. The location of documents memorializing the agreement are identified by agreement storage location 722.

It should be noted that the system and methods described above can be used by a particular user to search for media related to other users. For example, a user can provide seed media identifying a celebrity. This seed media can then be used to generate a user profile of the celebrity which can then be used to search for media related to the celebrity. Although the user can search for media related to the celebrity, the user, in one embodiment, is restricted from employing digital agent 118 to obtain license agreements or instructing hosts how to present media without the consent of the user identified by the user profile.

Figure 8:
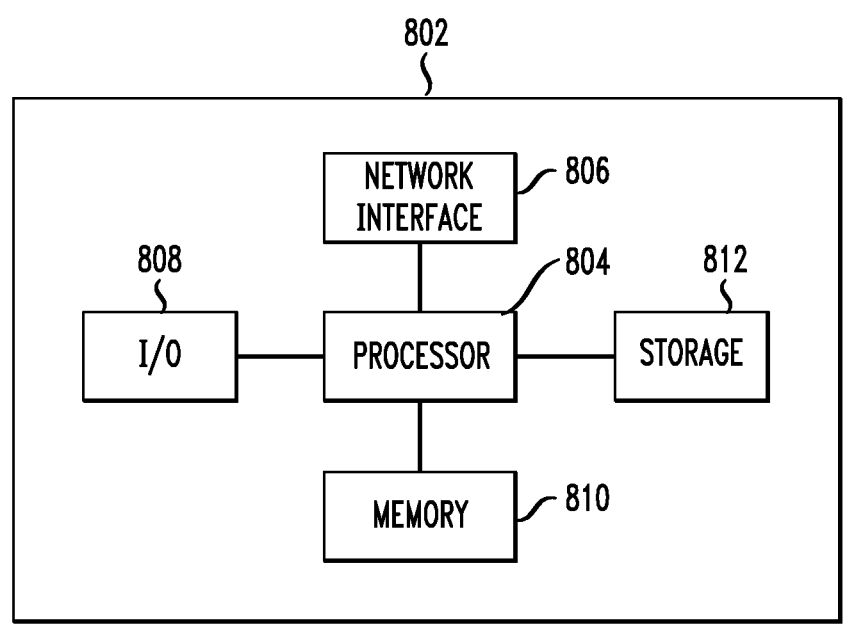
FIG. 8 depicts a high-level block diagram of computer which can be used for implementing a media server, digital agent, and user devices.

Media server 102, digital agent 118, and user devices 106-110 may be implemented using a computer. A high-level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.), and loaded into memory 810 when execution of the computer program instructions is desired. Thus, the method steps of FIGS. 2, 3, and 5 can be defined by the computer program instructions stored in the memory 810 and/or storage 812 and controlled by the processor 804 executing the computer program instructions. For example, the computer program instructions can be implemented as computer executable code programmed by one skilled in the art to perform an algorithm defined by the method steps of FIGS. 2, 3, and 5. Accordingly, by executing the computer program instructions, the processor 804 executes an algorithm defined by the method steps of FIGS. 2, 3, and 5. The computer 802 also includes one or more network interfaces 806 for communicating with other devices via a network. The computer 802 also includes input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for digital rights management comprising:
generating, by a media server comprising a processor, a user profile;
scanning, by the media server, a network for media content;
comparing, by the media server, media content received from a first host to the user profile by comparing the media content received from the first host to a plurality of user characteristics comprising user calendar entries;
assigning, by the media server, an identification confidence level to the media content received from the first host based on the comparing, by the media server, the media content received from the first host to the user profile;
updating the user profile based on the media content received from the first host to generate an updated user profile;
determining, by the media server, a responsible host different from the first host in response to the first host not being the responsible host; and
contacting, by a digital agent of the media server, the responsible host based on the identification confidence level and whether the first host allows users to do more with the media content received from the first host than access the media content received from the first host, the digital agent acting on behalf of a user associated with the user profile.

2. The method of claim 1 wherein the comparing, by the media server, the media content received from the first host to the user profile further comprises:
determining a characteristic confidence level for each of the plurality of user characteristics,
wherein the assigning the identification confidence level is based on determined characteristic confidence levels, and wherein the plurality of user characteristics further comprises a location of the user at specific dates and times, clothing owned by the user, clothing worn by the user, body movements particular to the user, people with which the user has been associated, places with which the user has been associated, user personal preferences, predefined events, predefined actions, an occupation of the user, and an employer of the user.

3. The method of claim 1, further comprising:
rescanning, by the media server, the network for additional media content;
comparing, by the media server, the additional media content to the updated user profile; and
updating, by the media server, the updated user profile based on the additional media content.

4. The method of claim 1, wherein the generating, by the media server comprising the processor, the user profile comprises:
receiving seed media describing the user; and
generating the plurality of user characteristics based on the seed media.

5. The method of claim 1, wherein the contacting, by the digital agent of the media server, the responsible host is further based on a media type.

6. The method of claim 1, wherein the contacting, by the digital agent of the media server, the responsible host is further based on content of the media content.

7. The method of claim 1, wherein the contacting, by the digital agent of the media server, the responsible host comprises transmitting a request to the responsible host to license the media content received from the first host.

8. An apparatus for digital rights management comprising:
a processor; and
a memory to store computer program instructions, the computer program instructions when executed on the processor cause the processor to perform operations comprising:
generating a user profile;
scanning a network for media content;
comparing media content received from a first host to the user profile by comparing the media content received from the first host to a plurality of user characteristics comprising user calendar entries;
assigning an identification confidence level to the media content received from the first host based on the comparing the media content received from the first host to the user profile;
updating the user profile based on the media content received from the first host to generate an updated user profile;
determining a responsible host different from the first host in response to the first host not being the responsible host; and
contacting, by a digital agent, the responsible host based on the identification confidence level and whether the first host allows users to do more with the media content received from the first host than access the media content received from the first host, the digital agent acting on behalf of a user associated with the user profile.

9. The apparatus of claim 8 wherein the comparing the media content received from the first host to a user profile further comprises:
determining a characteristic confidence level for each of the plurality of user characteristics,
wherein the assigning the identification confidence level is based on determined characteristic confidence levels, and wherein the plurality of user characteristics further comprises a location of the user at specific dates and times, clothing owned by the user, clothing worn by the user, body movements particular to the user, people with which the user has been associated, places with which the user has been associated, user personal preferences, predefined events, predefined actions, an occupation of the user, and an employer of the user.

10. The apparatus of claim 8, the operations further comprising:
rescanning the network for additional media content;
comparing the additional media content to the updated user profile;
updating the updated user profile based on the additional media content.

11. The apparatus of claim 8, wherein the generating the user profile comprises:
receiving seed media describing the user; and
generating the plurality of user characteristics based on the seed media.

12. The apparatus of claim 8, wherein the contacting the responsible host is further based on a media type.

13. The apparatus of claim 8, wherein the contacting the responsible host is further based on content of the media content.

14. The apparatus of claim 8, wherein the contacting the responsible host comprises transmitting a request to the responsible host to license the media content received from the first host.

15. A non-transitory computer readable medium storing computer program instructions for digital rights management, which, when executed on a processor, cause the processor to perform operations comprising:
generating a user profile;
scanning a network for media content
comparing media content, received from a first host to the user profile by comparing the media content received from the first host to a plurality of user characteristics comprising user calendar entries;
assigning an identification confidence level to the media content received from the first host based on the comparing the media content, received from the first host to the user profile;
updating the user profile based on the media content received from the first host to generate an updated user profile;
determining a responsible host different from the first host in response to the first host not being the responsible host; and
contacting, by a digital agent, the responsible host based on the identification confidence level and whether the first host allows users to do more with the media content received from the first host than access the media content received from the first host, the digital agent acting on behalf of a user associated with the user profile.

16. The non-transitory computer readable medium of claim 15 wherein the comparing media content received from a first host to the user profile further comprises:
determining a characteristic confidence level for each of the plurality of user characteristics,
wherein the assigning an identification confidence level is based on determined characteristic confidence levels, and the plurality of user characteristics further comprises a location of the user at specific dates and times, clothing owned by the user, clothing worn by the user, body movements particular to the user, people with which the user has been associated, places with which the user has been associated, user personal preferences, predefined events, predefined actions, an occupation of the user, and an employer of the user.

17. The non-transitory computer readable medium of claim 15, the operations further comprising:
rescanning the network for additional media content;
comparing the additional media content to the updated user profile;
updating the updated user profile based on the additional media content.

18. The non-transitory computer readable medium of claim 15 wherein the generating the user profile comprises:
receiving seed media describing the user; and
generating the plurality of user characteristics based on the seed media.

19. The non-transitory computer readable medium of claim 15, wherein the contacting the responsible host is further based on a media type.

20. The non-transitory computer readable medium of claim 15, wherein the contacting the responsible host comprises transmitting a request to the responsible host to license the media content received from the first host.

* * * * *